(12) United States Patent
Kawase

(10) Patent No.: US 8,293,391 B2
(45) Date of Patent: Oct. 23, 2012

(54) BATTERY

(75) Inventor: Satomi Kawase, Miyoshi (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 73 days.

(21) Appl. No.: 13/001,462

(22) PCT Filed: Jul. 1, 2009

(86) PCT No.: PCT/IB2009/006132
§ 371 (c)(1),
(2), (4) Date: Dec. 27, 2010

(87) PCT Pub. No.: WO2010/001229
PCT Pub. Date: Jan. 7, 2010

(65) Prior Publication Data
US 2011/0111275 A1 May 12, 2011

(30) Foreign Application Priority Data
Jul. 2, 2008 (JP) .................. 2008-173147

(51) Int. Cl.
*H01M 10/40* (2006.01)
*H01M 2/02* (2006.01)
(52) U.S. Cl. .......................... 429/94; 429/156
(58) Field of Classification Search .......... 429/94
See application file for complete search history.

(56) References Cited

U.S. PATENT DOCUMENTS
7,585,591 B2 * 9/2009 Mizutani ............... 429/211
2006/0003221 A1 1/2006 Yeo
2006/0008701 A1 1/2006 Kim et al.
2006/0110660 A1 5/2006 Satou et al.
2010/0291425 A1* 11/2010 Takagi et al. .......... 429/94
2011/0111275 A1* 5/2011 Kawase .................. 429/94

FOREIGN PATENT DOCUMENTS
JP 9-219181 8/1997
JP 2001-236937 8/2001
JP 2004-47332 2/2004
(Continued)

OTHER PUBLICATIONS

Office Action for U.S. Appl. No. 12/294,476, filed Sep. 25, 2008, mailed Nov. 29, 2011.

(Continued)

*Primary Examiner* — John S Maples
(74) *Attorney, Agent, or Firm* — Finnegan, Henderson, Farabow, Garrett & Dunner, LLP

(57) ABSTRACT

A battery (100) includes a flat wound electrode body (10) that is obtained by winding a first electrode sheet (20) and a second electrode sheet (30) in a flat shape via separator sheets (40*a*, 40*b*). The first electrode sheet (20) is disposed in the flat wound electrode body (10) so as to be wound on the outer peripheral side with respect to the second electrode sheet (30). The first electrode sheet (20) is wound so as to enfold a winding end portion (38) of the second electrode sheet (30). A winding end portion (28) of the first electrode sheet (20) is disposed so as to pass either of the straight portions (12*a*, 12*b*) or rounded portions (14*a*, 14*b*) where the winding end portion (38) of the second electrode sheet (30) is disposed and reach the next straight portion (12*a*, 12*b*) or pass through the next straight portion.

7 Claims, 8 Drawing Sheets

FOREIGN PATENT DOCUMENTS

| | | |
|---|---|---|
| JP | 2005-222887 | 8/2005 |
| JP | 2005-339930 | 12/2005 |
| JP | 2006-156392 | 6/2006 |
| JP | 2006-278184 | 10/2006 |
| JP | 2007-26939 | 2/2007 |
| JP | 2007-123009 | 5/2007 |
| JP | 2007-242519 | 9/2007 |
| JP | 2007-311139 | 11/2007 |
| JP | 2008-78008 | 4/2008 |
| KR | 2006-99028 | 9/2006 |

OTHER PUBLICATIONS

Notification of Reason(s) for Refusal dated Oct. 28, 2010 for KR 10-2008-7023722.

International Search Report in International Application No. PCT/IB2009/006132; Mailing Date: Oct. 14, 2009.

Written Opinion of the International Searching Authority in International Application No. PCT/IB2009/006132; Mailing Date: Oct. 14, 2009.

Response to Written Opinion in International Application No. PCT/IB2009/006132; Jan. 25, 2010.

Notification of Reason for Refusal in Japanese Patent Application No. 2006-256809; Drafting Date: Dec. 3, 2008.

Notification of Reason(s) for Refusal in Japanese Patent Application No. 2008-173147; Drafting Date: Nov. 15, 2010.

* cited by examiner

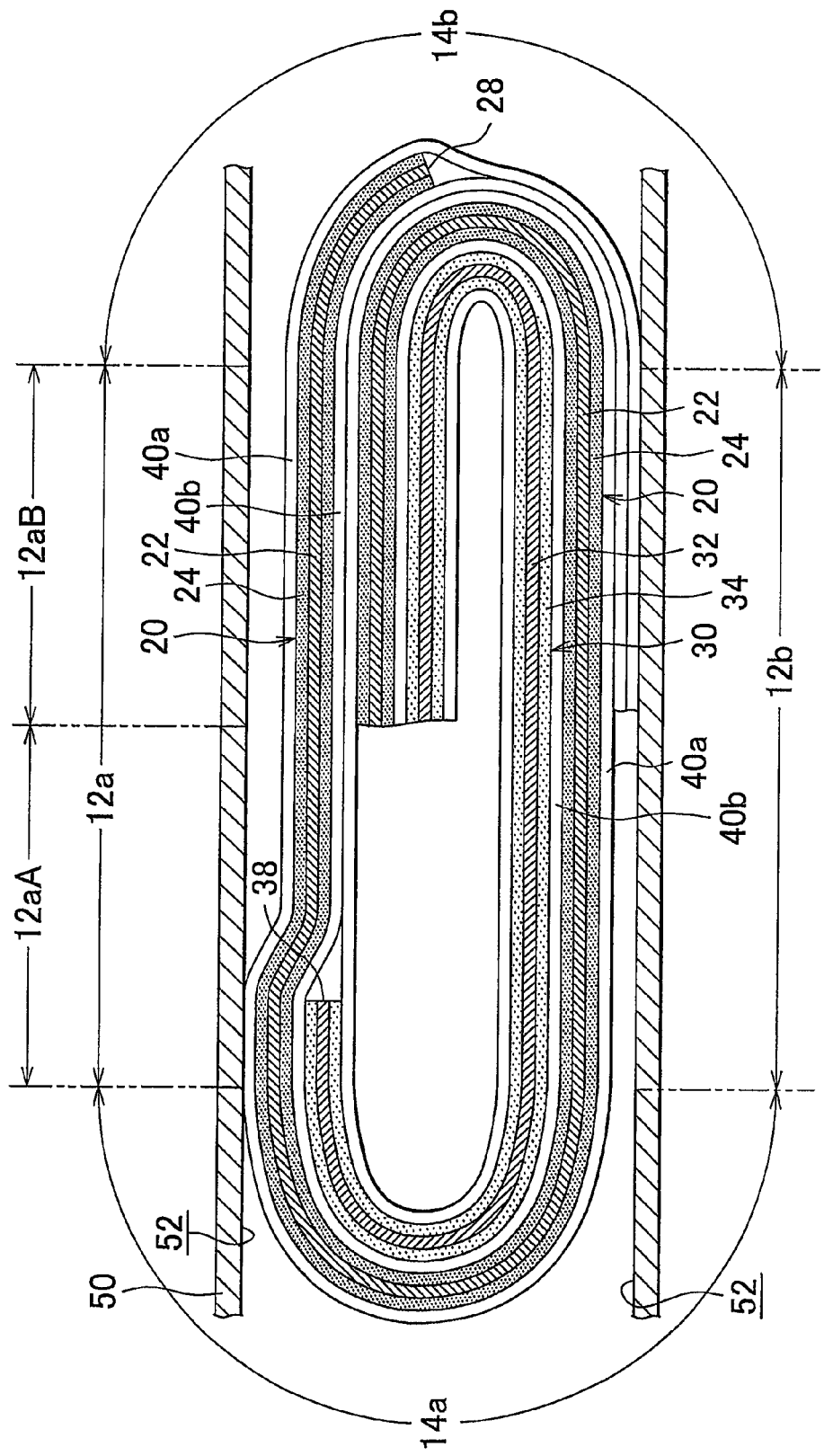

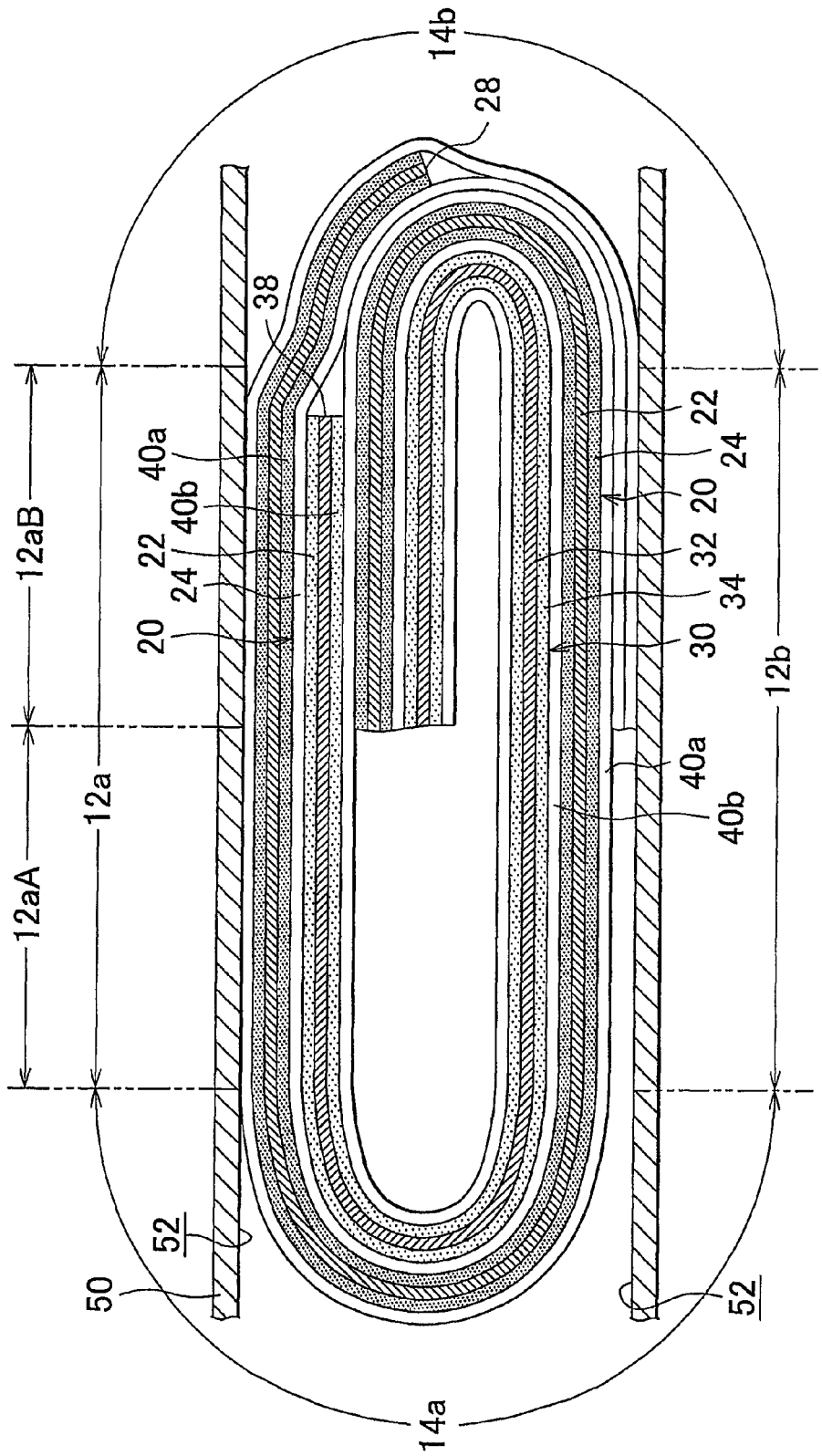
FIG. 12 COMPARATIVE EXAMPLE

BATTERY

CROSS-REFERENCE TO RELATED APPLICATIONS

This application is a national phase application of International Application No. PCT/IB2009/006132, filed Jul. 1, 2009, and claims the priority of Japanese Application No. 2008-173147, filed Jul. 2, 2008, the contents of both of which are incorporated herein by reference.

BACKGROUND OF THE INVENTION

1. Field of the Invention

The invention relates to a battery, and more particularly to a battery structure provided with a flat wound electrode body that has been wound in a flat shape.

2. Description of the Related Art

In recent years, the importance of lithium ion batteries, nickel-hydrogen batteries, and other secondary batteries has increased in applications to power sources for vehicles or power sources for personal computers and portable terminals. In particular, lightweight lithium ion batteries, which make it possible to obtain a high energy density, are expected to be advantageously used as high-capacity power sources for vehicles.

A battery provided with an electrode body having a wound structure (wound electrode body) is a typical example of such a high-capacity lithium ion battery. In the battery of this type, a positive electrode sheet and a negative electrode sheet are disposed opposite each other via a separator sheet, and the resultant laminate is wound, thereby increasing the reaction surface area of the positive and negative electrodes. As a consequence, energy density can be increased and capacity can be raised.

When a battery is configured, the above-described wound electrode body is sometimes accommodated in an angular battery case (typically a flat box-like case). With such a configuration, the wound electrode body is pressed from two sides to mold in a flat shape and then inserted in the angular case. For example, Japanese Patent Application Publication No. 2007-242519 (JP-A-2007-242519) discloses a battery in which a tape that prevents unwinding is attached on the outermost periphery of a wound electrode body so as to prevent the wound electrode body from unwinding when the wound electrode body is press molded in a flat shape. Examples of other patent documents that cover technology relating to flat wound electrode bodies include Japanese Patent Application Publication No. 2005-222887 (JP-A-2005-222887), Japanese Patent Application Publication No. 2004-47332 (JP-A-2004-47332), and Japanese Patent Application Publication No. 2007-26939 (JP-A-2007-26939).

However, the aforementioned tape that prevents unwinding is designed to inhibit the unwinding of the outermost periphery of the flat wound electrode body, and an appropriate surface pressure applied to the wound electrode body is difficult to maintain by attaching the tape that prevents unwinding. Thus, where the flat wound electrode body expands during charging, a pressure produced by the electrode body expansion is particularly high at the winding end portions of the positive electrode sheet and negative electrode sheet (end positions on the outer periphery side in the longitudinal direction of the sheet; same hereinbelow), but the attached tape that prevents unwinding cannot apply a pressure acting in the expansion direction of the wound electrode body and the winding end portions of the positive electrode sheet and negative electrode sheet become loose.

FIG. 10 shows an example of a principal cross section of a conventional flat wound electrode body 1. In this configuration, a negative sheet 2 is disposed so as to be wound on the outer peripheral side with respect to a positive electrode sheet 3. A winding end portion 4 of the negative electrode sheet 2 and a winding end portion 5 of the positive electrode sheet 3 are disposed in the same curvature portion (rounded portion) 6 of the flat wound electrode body 1. Where the flat wound electrode body 1 expands during charging, the winding end portion 4 of the negative electrode sheet 2 and the winding end portion 5 of the positive electrode sheet 3 can become loose, and if the winding end portion 5 of the positive electrode sheet 3 located on the inner peripheral side is loose, because the surface pressure in the opposing portions of the negative electrode sheet 2 and the positive electrode sheet 3 is uneven, an electrode reaction proceeds unevenly between the positive electrode and negative electrode. Such an uneven electrode reaction between the positive electrode and negative electrode is undesirable because battery life in cycle endurance can be shortened.

SUMMARY OF THE INVENTION

The invention provides a battery including a flat wound electrode body that makes it possible to maintain a stable surface pressure applied to the flat wound electrode body.

The first aspect of the invention relates to a battery including a flat wound electrode body that is obtained by winding a first electrode sheet and a second electrode sheet in a flat shape via a separator sheet and constituted by two straight portions and two rounded portions; and a battery case that accommodates the flat wound electrode body. The first electrode sheet is disposed in the flat wound electrode body so as to be wound on the outer peripheral side with respect to the second electrode sheet. The first electrode sheet is wound so as to enfold a winding end portion of the second electrode sheet. A winding end portion of the first electrode sheet is disposed so as to pass either of the straight portions or the rounded portions where the winding end portion of the second electrode sheet is disposed and reach the next straight portion (that is, the initial straight portion located forward in the winding direction) or pass through (further forward in the winding direction) the next straight portion.

With such a configuration, because the first electrode sheet is wound so as to enfold the winding end portion of the second electrode sheet, and the winding end portion of the first electrode sheet is wound and disposed so as to pass either of the straight portions or the rounded portions where the winding end portion of the second electrode sheet is disposed and reach the next straight portion or pass through the next straight portion, the winding end portion of the second electrode sheet can be tightly wound by an appropriate tightening force by the first electrode sheet and a stable surface pressure applied to the winding end portion of the second electrode sheet can be maintained. In addition, because the winding end portion of the first electrode sheet is wound and disposed so as to pass either of the straight portions or the rounded portions where the winding end portion of the second electrode sheet is disposed and reach the next straight portion or pass through the next straight portion, the first electrode sheet that has enfolded the winding end portion of the second electrode sheet can be pressed in by the side surface of the inner wall of the battery case. As a result, the first electrode sheet can be reliably held even when a force acts in the expansion direction of the flat wound electrode body during charging. In other words, according to the configuration described above, even when the flat wound electrode body repeatedly expands and contracts, the surface pressure applied to the winding end portion of the second electrode sheet can be maintained with good stability (evenly) by the stable tightening force of the first electrode sheet and a uniform electrode reaction can be caused to proceed between the positive electrode and negative electrode. As a result, a battery having good battery performance (for example, cycle characteristic) can be provided.

The winding end portion of the second electrode sheet may be disposed in either of the rounded portions. The winding end portion of the first electrode sheet may be disposed in the other rounded portion where the winding end portion of the second electrode sheet is not disposed. With such a configuration, because the winding end portion of the second electrode sheet is disposed in either of the rounded portions and the winding end portion of the first electrode sheet is disposed in the other rounded portion, no excess edge (that is, the winding end portion of the first electrode sheet) is formed in the straight portion of the flat wound electrode body. Therefore, when a force acts in the expansion direction of the flat wound electrode body, a uniform load can be applied by the battery case to the straight portion of the flat wound electrode body. Therefore, the electrode reaction between the positive electrode and negative electrode can proceed more uniformly and battery performance (for example, a cyclic charge-discharge characteristic) can be further improved.

The winding end portion of the second electrode sheet may be disposed in either of the straight portions. The winding end portion of the first electrode sheet may be disposed in the other straight portion where the winding end portion of the second electrode sheet is not disposed. With such a configuration, a tightening force that maintains a stable surface pressure acting upon the flat wound electrode body can be applied to the first electrode sheet on the outer peripheral side. As a result, the winding end portion of the second electrode sheet can be reliably held.

The winding end portion of the second electrode sheet may be disposed in either of the rounded portions. Furthermore, the winding end portion of the first electrode sheet may pass the rounded portion where the winding end portion of the second electrode sheet is disposed and may be disposed in the next straight portion (that is, the straight portion located forward in the winding direction). With such a configuration, a tightening force that maintains a stable surface pressure acting upon the flat wound electrode body can be applied to the first electrode sheet on the outer peripheral side. As a result, the winding end portion of the second electrode sheet can be reliably held.

The second aspect of the invention relates to a battery including: a flat wound electrode body that is obtained by winding a first electrode sheet and a second electrode sheet in a flat shape via a separator sheet; and a battery case that accommodates the flat wound electrode body. A first rounded portion, a first straight portion, a second rounded portion, and a second straight portion are successively formed on a circumference of the flat wound electrode body. The first electrode sheet is disposed in the flat wound electrode body so as to be wound on the outer peripheral side with respect to the second electrode sheet. The first electrode sheet is wound so as to enfold a winding end portion of the second electrode sheet. The winding end portion of the second electrode sheet is disposed in the first half of the first straight portion. A winding end portion of the first electrode sheet is disposed in the second rounded portion.

The third aspect of the invention relates to a battery pack including, as unit batteries, a plurality of the above-described batteries. The plurality of unit batteries are arranged in an orientation such that the straight portions of the flat wound electrode bodies accommodated in battery cases of the respective unit batteries face each other. A restriction member is attached to an outer side of the battery case of each unit battery so that a restriction force is applied in the arrangement direction. A wound state of the first electrode sheet in the flat wound electrode body of each unit battery is maintained by the restriction force.

With the battery pack of such a configuration, the first electrode sheet of the flat wound electrode body can be strongly held in a predetermined wound state by a restriction force of the restriction member. Therefore, even when the flat wound electrode body repeatedly expands and contracts during charging and discharging, the surface pressure applied to the winding end portion of the second electrode sheet can be maintained with good stability (evenly) by the stable tightening force of the first electrode sheet and a uniform electrode reaction can be caused to proceed between the electrode sheets. Therefore, with such a configuration, a battery pack including unit batteries having good battery performance (for example, cycle characteristic) can be provided.

BRIEF DESCRIPTION OF THE DRAWINGS

The features, advantages, and technical and industrial significance of this invention will be described in the following detailed description of example embodiments of the invention with reference to the accompanying drawings, in which like numerals denote like elements, and wherein:

FIG. 11 illustrates an example of another mode in which the object of the invention can be attained; and FIG. 12 illustrates a comparative example relating to the other mode (FIG. 11) in which the object of the invention can be attained

DETAILED DESCRIPTION OF EMBODIMENTS

The preferred embodiments of the invention will be described below with reference to the appended drawings. In the figures, structural elements and components producing like actions will be denoted by like reference symbols. An angular lithium ion secondary battery 100 will be explained below in greater detail as an embodiment of the invention, but the invention is not intended to be limited by the description of this embodiment. The dimensional relationship (length, width, thickness, etc.) in the figures does not reflect the actual dimensional relationship.

Figure 1:
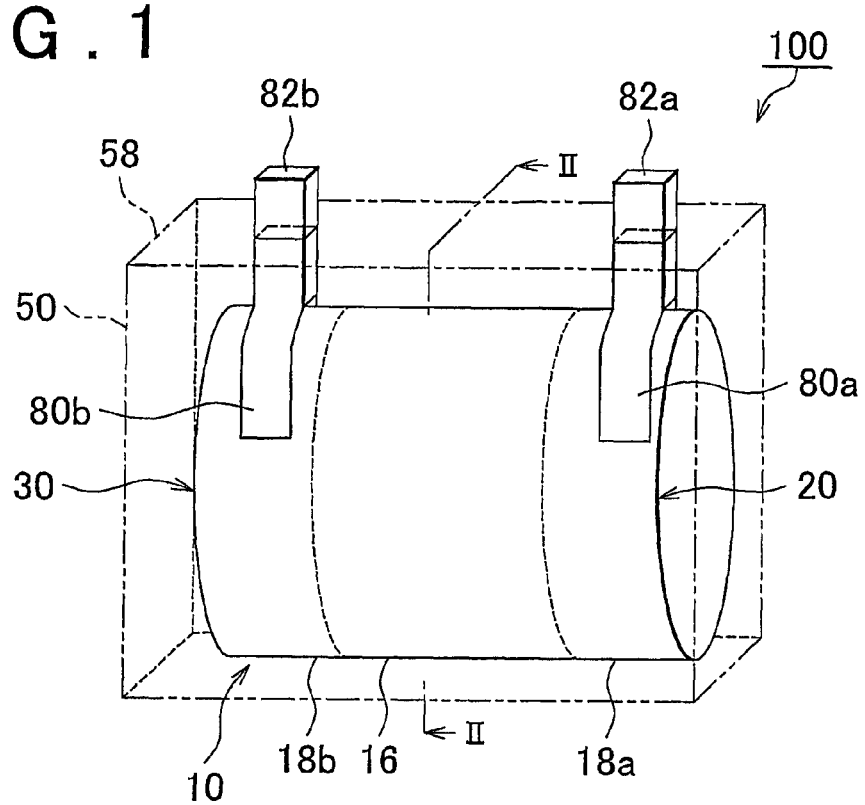
FIG. 1 is a perspective view illustrating schematically a battery of an embodiment of the invention.
Figure 2:
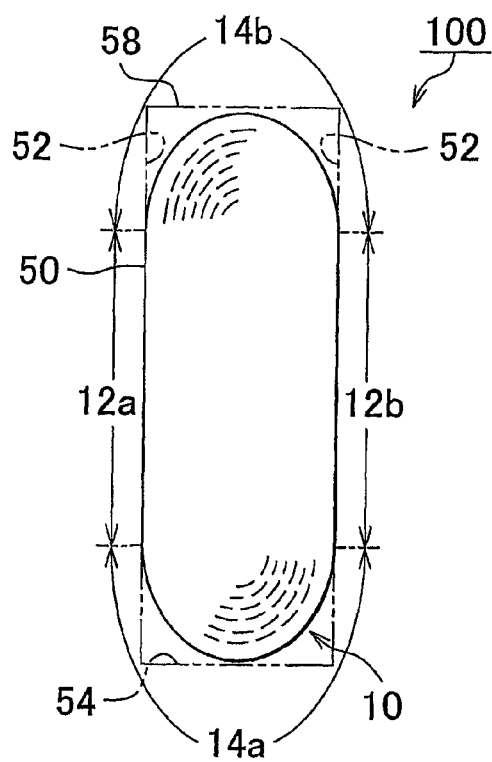
FIG. 2 is a cross-sectional view illustrating schematically a II-II section in FIG. 1.

Embodiment 1. A configuration of the angular lithium ion battery 100 of an embodiment of the invention will be described below with reference to FIGS. 1 and 2. FIG. 1 is a perspective view illustrating schematically an external appearance of the battery 100 of Embodiment 1. FIG. 2 is a cross-sectional view illustrating schematically the cross-section II-II in FIG. 1. The battery 100 includes a flat wound electrode body 10 wound in a flat shape and a battery case 50 that accommodates the flat wound electrode body 10.

The battery case 50 has a shape capable of accommodating the below-described flat wound electrode body 10. In the example shown in the figure, the battery case has an angular (box-like) shape. The material of the battery case 50 is not particularly limited. Examples of suitable materials include metal materials with good thermal conductivity. Examples of such metal materials include aluminum, stainless steel, and steel plated with nickel. In Embodiment 1, the battery case 50 has an open upper end and the below-described flat wound electrode body 10 is inserted through the open upper end.

The flat wound electrode body 10 is constituted by predetermined battery constituent materials (active materials of positive and negative electrodes, collectors of positive and negative electrodes, separators, and the like), similarly to a typical lithium ion secondary battery. As shown in the below-described FIG. 3, the flat wound electrode body 10 can be produced by smashing and flattening from a side surface direction an electrode body (wound electrode body) obtained by winding a first electrode sheet 20 and a second electrode sheet 30 via the separator sheets 40a, 40b. Furthermore, as shown in FIG. 2, the flat wound electrode body 10 is configured by two straight portions 12a, 12b and two rounded portions 14a, 14b (as clearly seen from a cross section in the direction perpendicular to the winding axis direction).

The two straight portions 12a, 12b correspond to flat portions (planar portions) of the side surface of the outer wall constituting the flat wound electrode body 10 and are disposed opposite the corresponding wide side surfaces 52 of the inner walls constituting the battery case 50. In Embodiment 1, the two straight portions 12a, 12b are disposed so as to be in contact with the wide side surfaces 52 of the battery case 50 after the flat wound electrode body 10 has been accommodated in the battery case 50. The two rounded portions 14a, 14b correspond to curvature portions (curved portions) of the side surface of the outer walls constituting the flat wound electrode body 10 and are disposed opposite a bottom surface 54 and a lid 58 of the battery case 50 (without contact therewith). In Embodiment 1, the two rounded portions 14a, 14b are disposed so as not to be in contact with the wide side surfaces 52 of the battery case 50 after the flat wound electrode body 10 has been accommodated in the battery case 50.

Figure 3:
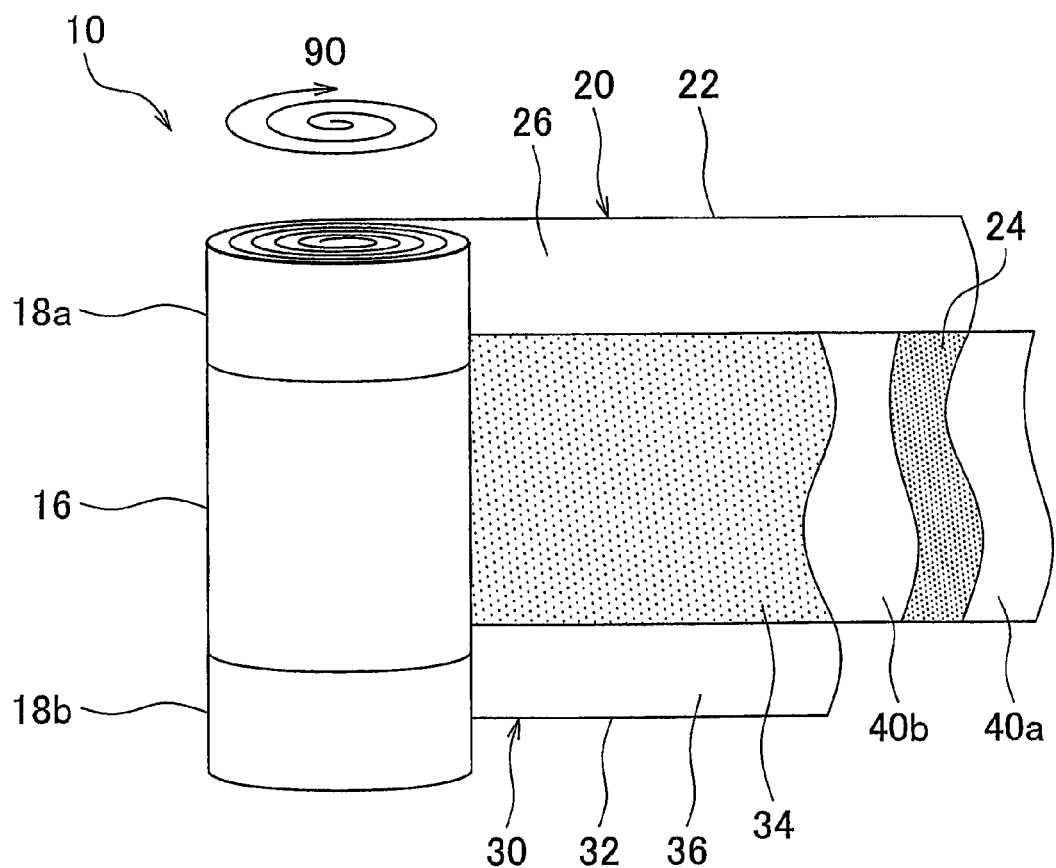
FIG. 3 illustrates a flat wound electrode body of the embodiment of the invention.

The configuration of the flat wound electrode body 10 will be further described below with reference to FIGS. 3 and 4. As shown in FIG. 3, the flat wound electrode body 10 of Embodiment 1, is a flat wound electrode body obtained by flatly winding the first electrode sheet 20 and second electrode sheet 30 via two separator sheets 40a, 40b.

In Embodiment 1, the first electrode sheet 20 is a negative electrode sheet, and the second electrode sheet 30 is a positive electrode sheet. The negative electrode sheet 20 is formed by attaching a negative electrode active material layer 24 for a battery to both surfaces of an elongated sheet-like foil-shaped negative electrode collector 22. The negative electrode active material layer 24 is not attached to one side edge (upper side edge portion in FIG. 3) along an end side in the width direction of the negative electrode sheet 20, thereby forming a negative electrode active material non-formation portion 26 in which the negative electrode collector 22 is exposed over a constant width. Similarly to the negative electrode sheet 20, the positive electrode sheet 30 is formed by attaching a positive electrode active material layer 34 for a battery to both surfaces of an elongated sheet-like foil-shaped positive electrode collector 32. The positive electrode active material layer 34 is not attached to one side edge (lower side edge portion in FIG. 3) along an end side in the width direction of the positive electrode sheet 30, thereby forming a positive electrode active material non-formation portion 36 in which the positive electrode collector 32 is exposed over a constant width.

When the flat wound electrode body 10 is fabricated, first, a laminate is formed by laminating the separator sheet 40a, negative electrode sheet 20, separator sheet 40b, and positive electrode sheet 30 in the order of description. When the laminate is formed, the negative electrode active material non-formation portion (exposed portion of the negative electrode collector 22) 26 of the negative electrode sheet 20 and the positive electrode active material non-formation portion (exposed portion of the positive electrode collector 32) 36 of the positive electrode sheet 30 are disposed so as to protrude outwardly from the separator sheets 40a, 40b.

Then, the laminate is wound by winding up on a cylindrical winding core. In this process, the negative electrode sheet (first electrode sheet) 20 is disposed so as to be wound on the outer peripheral side with respect to the positive electrode sheet (second electrode sheet) 30. When the winding of the negative electrode sheet 20, positive electrode sheet 30, and two separator sheets 40a, 40b is completed, these components are cut in the end positions to obtain a predetermined length. A wound body is formed by winding up the winding end portions of each sheet that have been cut in the end positions. A tape that prevents unwinding is attached to the outermost periphery of the wound body and fixes the outermost periphery (either of the separator sheets 40a, 40b) of the flat wound electrode body so as to prevent the wound body from unwinding.

The produced wound body is then press molded from a side surface direction (typically smashed and flattened) to obtain a flat shape in the transverse section. The process molding is carried out so that the winding end portion 28 of the negative electrode sheet 20 and the winding end portion 38 of the positive electrode sheet 30 could be disposed in respective below-described predetermined positioned in the outermost peripheral portions of the flat wound electrode body. The flat wound electrode body 10 of Embodiment 1 is thus produced. The production of the flat wound electrode body 10 is not limited to the above-described method of pressing the wound body in a flat shape. For example, winding in a flat shape may be performed from the very beginning by using a flat winding core.

Figure 4:
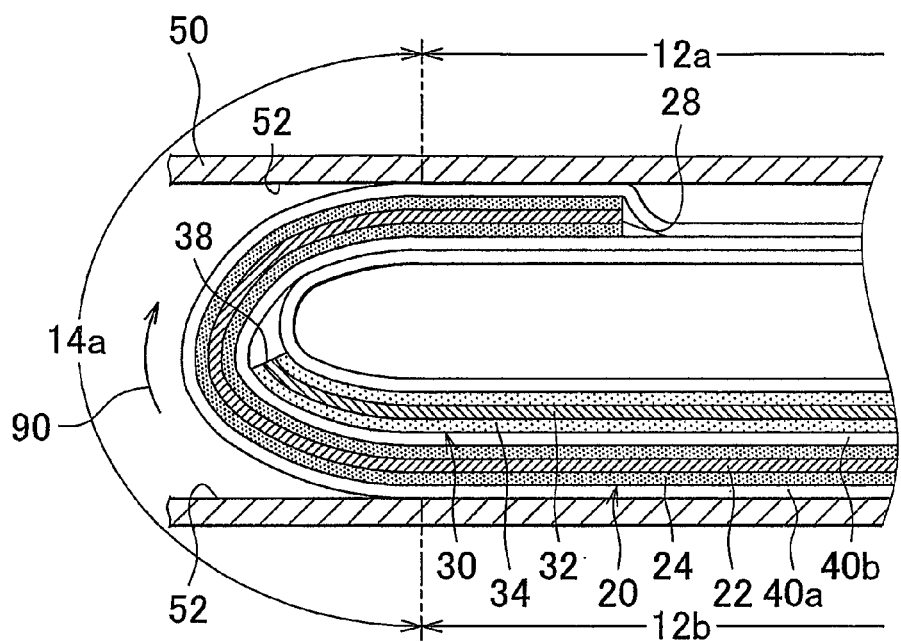
FIG. 4 is a principal cross-sectional view of the battery of the embodiment of the invention.

A principal cross section of the flat wound electrode body 10 thus obtained is shown in FIG. 4. As shown in FIG. 4, the negative electrode sheet 20 serving as a first electrode sheet is disposed in the flat wound electrode body 10 so as to be wound on the outer peripheral side with respect to the positive electrode sheet 30 serving as a second electrode sheet. Furthermore, the negative electrode sheet 20 is wound so as to enfold a winding end portion 38 of the positive electrode sheet 30. The winding end portion 28 of the negative electrode sheet 20 is disposed so as to pass the rounded portion where the winding end portion 38 of the positive electrode sheet 30 is disposed and reach the next straight portion (that is, the initial straight portion located forward in the winding direction 90) or pass through (further forward in the winding direction 90) the next straight portion.

In Embodiment 1, the winding end portion 38 of the positive electrode sheet 30 is disposed in the rounded portion 14a on the left side in the figure, whereas the winding end portion 28 of the negative electrode sheet 20 is disposed in the straight portion 12a on the upper side in the figure. Thus, the winding end portion 28 of the negative electrode sheet 20 is disposed so as to pass the rounded portion 14a on the left side in the figure where the winding end portion 38 of the positive electrode sheet 30 is disposed and reach the next straight portion 12a (that is, the initial straight portion 12a located forward in the winding direction 90; the straight portion 12a on the upper side in the figure). Furthermore, in Embodiment 1, the winding end portion 28 of the negative electrode sheet 20 disposed in the straight portion 12a on the upper side in the figure is pushed by a wide side surface 52 of the inner wall (side surface of the inner wall facing the straight portion 12a on the upper side in the figure) of the battery case 50 and held in this position.

With the above-described configuration of Embodiment 1, the first electrode sheet (here, the negative electrode sheet) 20 is wound so as to enfold the winding end portion 38 of the second electrode sheet (here, the positive electrode sheet) 30, and the winding end portion 28 of the first electrode sheet 20 is disposed so as to pass the rounded portion 14a where the winding end portion 38 of the second electrode sheet 30 is disposed and reach the next straight portion 12a. As a result, the winding end portion 38 of the second electrode sheet 30 can be tightly wound by an appropriate tightening force by the first electrode sheet 20 and a stable surface pressure applied to the winding end portion 38 of the second electrode sheet 30 can be maintained.

In addition, the winding end portion 28 of the first electrode sheet 20 is disposed so as to pass the rounded portion 14a where the winding end portion 38 of the second electrode sheet 30 is disposed and reach the next straight portion 12a. Therefore, the first electrode sheet 20 that has enfolded the winding end portion 38 of the second electrode sheet 30 can be pressed in by the side surface 52 of the inner wall (side surface of the inner wall facing the straight portion 12a) of the battery case 50. As a result, the first electrode sheet 20 can be reliably held even when a force acts in the expansion direction of the flat wound electrode body 10 during charging.

Thus, with the above-described configuration, even when the flat wound electrode body 10 repeatedly expands and contracts, the surface pressure applied to the winding end portion 38 of the second electrode sheet 30 can be maintained with good stability (evenly) by the stable tightening force of the first electrode sheet 20 and a uniform electrode reaction can be caused to proceed between the positive electrode and negative electrode. As a result, a battery having good battery performance (for example, cycle characteristic) can be provided.

Constituent materials that constitute the battery 100 of Embodiment 1 will be described below with reference to FIGS. 1 to 3. As shown in FIG. 3, the flat wound electrode body 10 is a flat wound electrode body 10 in which the negative electrode sheet 20 and positive electrode sheet 30 are wound in a flat shape together with a total of two separator sheets 40a, 40b.

Because the negative electrode active material non-formation portion 26 (exposed portion of the negative electrode collector 22) of the negative electrode sheet 20 and the positive electrode active material non-formation portion 36 (exposed portion of the positive electrode collector 32) of the positive electrode sheet 30 are wound so as to protrude outwardly from the separator sheets 40a, 40b, a portion at the end of the negative electrode sheet 20 and positive electrode sheet 30 protrudes outwardly from the respective winding core portion 16 (that is, a portion where the negative electrode active material formation portion of the negative electrode sheet 20, positive electrode active material formation portion of the positive electrode sheet 30, and separator sheets 40a, 40b are tightly wound). As shown in FIG. 1, a negative electrode collector terminal 80a and a positive electrode collector terminal 80b are attached to a protruding portion on the negative electrode side (that is, the non-formation portion of the negative electrode active material layer) 18a and a protruding portion on the positive electrode side (that is, the non-formation portion of the positive electrode active material layer) 18b, and these collector terminals are electrically connected to a negative electrode terminal 82a and a positive electrode terminal 82b, respectively. In Embodiment 1, the negative electrode terminal 82a and a positive electrode terminal 82b are attached to the lid 58 of the battery case 50 via respective gaskets (not shown in the figure).

The materials and components constituting the flat wound electrode body 10 may be similar to those of the electrode body of the conventional lithium ion battery and are not particularly limited.

For example, the negative electrode sheet 20 can be formed by applying a negative electrode material layer for a liquid ion battery to an elongated negative electrode collector. A copper foil and other metal foils suitable for negative electrodes can be advantageously used for the negative electrode collector 22. One or more substances that have been conventionally used in lithium ion batteries can be used without any limitation as the negative electrode active material. Examples of preferred substances include carbon-containing materials such as graphite carbon and amorphous carbon and lithium-containing transition metal oxides and transition metal nitrides. For example, a preferred negative electrode sheet 20 can be obtained by using a copper foil with a length of 2 to 4 m (for example, 2.9 m), a width of 8 to 12 cm (for example, 10 cm), and a thickness of about 5 to 20 μm (for example 10 μm) and forming a negative electrode active material layer for a lithium ion battery (for example, a layer containing 98 wt. % graphite, 1 wt. % styrene butadiene rubber, and 1 wt. % carboxymethyl cellulose) including graphite as the main component by a usually employed method on a predetermined region of the copper foil surface.

The positive electrode sheet 30 can be formed by applying a positive electrode active material for a lithium ion battery to an elongated positive electrode collector. A metal foil suitable for positive electrodes, such as an aluminum foil, can be advantageously used for the positive electrode collector 32. One or more substances that have been conventionally used in lithium ion batteries can be used without any limitation as the positive electrode active material. Examples of preferred substances include $LiMn_2O_4$, $LiCoO_2$, and $LiNiO_2$. For example, a preferred positive electrode sheet 30 can be obtained by using an aluminum foil with a length of 2 to 4 m (for example, 2.7 m), a width of 8 to 12 cm (for example, 10 cm), and a thickness of about 5 to 20 μm (for example 15 μm) and forming a positive electrode active material layer for a lithium ion battery (for example, a layer containing 88 wt. % lithium nickelate, 10 wt. % acetylene black, 1 wt. % polytetrafluoroethylene, and 1 wt. % carboxymethyl cellulose) including lithium nickel oxide as the main component by a usually employed method on a predetermined region of the copper foil surface.

Sheets constituted by a porous polyolefin resin are suitable as separator sheets 40a, 40b that can be advantageously used between the positive and negative electrodes 20, 30. For example, porous separator sheets made from a synthetic resin (for example, from a polyolefin such as polyethylene) with a length of 2 to 4 m (for example, 3.1 m), a width of 8 to 12 cm (for example, 11 cm), and a thickness of about 5 to 30 μm (for example 25 μm) can be advantageously used.

For example, a nonaqueous electrolytic solution prepared by dissolving an electrolyte in a nonaqueous solvent can be used as the electrolytic solution to be accommodated together with the flat wound electrode body 10 in the battery case 50. Examples of the nonaqueous solvent include ethylene carbonate, propylene carbonate, dimethyl carbonate (DMC), diethyl carbonate, ethylmethyl carbonate (EMC), 1,2-dimethoxyethane, 1,2-diethoxyethane, tetrahydrofuran, and 1,3-dioxolan, and these solvents can be used individually or in combinations of two or more thereof. Furthermore, one or more electrolytes selected from the group including various lithium salts including fluorine as a constituent element can be used as the electrolyte (support salt) constituting the electrolytic solution. For example, one or more lithium salts selected from the group including $LiPF_6$, $LiBF_4$, $LiAsF_6$, $LiCF_3SO_3$, $LiC_4F_9SO_3$, $LiN(CF_3SO_2)_2$, and $LiC(CF_3SO_2)_3$ can be used.

Figure 5:
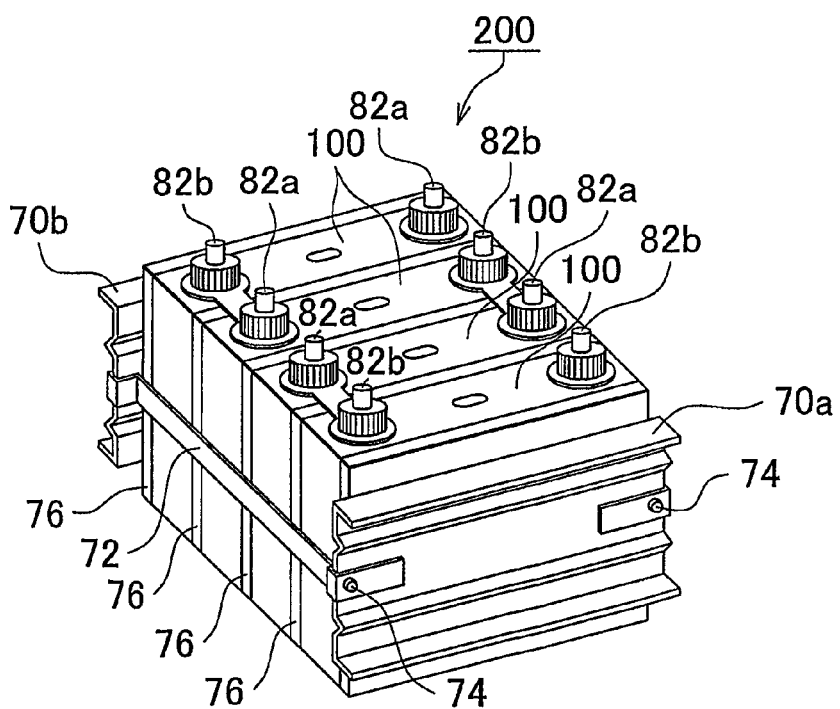
FIG. 5 is a perspective view illustrating external appearance of a battery pack of an embodiment of the invention.
Figure 6:
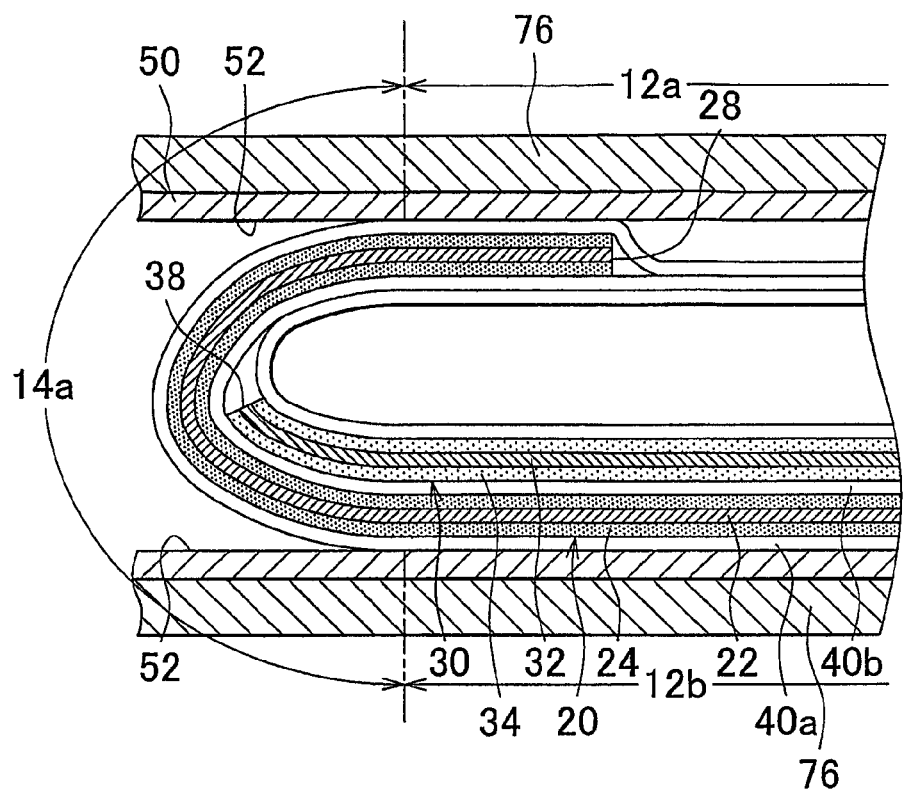
FIG. 6 is a principal cross-sectional view of the battery pack of the embodiment of the invention.

The battery 100 of Embodiment 1 can be obtained by accommodating the flat wound electrode body 10 in the battery case 50, pouring the electrolytic solution into the case, and sealing. A battery pack may be further constructed using the battery 100 thus obtained. Thus, as shown in FIGS. 5 and 6, a battery pack 200 composed of a plurality of batteries 100 of the present embodiment as unit batteries can be advantageously constructed. In this embodiment, the unit batteries 100 are arranged in a predetermined direction and restricted in a state in which a load is applied in the arrangement direction.

More specifically, every other of a plurality of unit batteries 100 is turned over and the unit batteries 100 are disposed so that the negative terminals 82*a* and positive terminals 82*b* of the unit batteries 100 are disposed alternately and that the straight portions 12*a*, 12*b* of the flat wound electrode body 10 accommodated in respective battery cases 50 of the unit batteries 100 are arranged in the opposite direction (direction in which the wide surfaces of battery cases face each other). A restricting member is then attached to the outer side of the battery cases 50 of the unit batteries 100 so as to apply a restriction force in the arrangement direction.

In the present embodiment, the restriction member is constituted by a pair of restriction plates 70*a*, 70*b* and a spacer plate 76. Thus, the restriction plates 70*a*, 70*b* that will restrict the entire plurality of the unit batteries 100 are disposed to surround the arranged unit batteries 100, and the spacer 76 that is restricted together with the unit batteries 100 when a load is applied in the arrangement direction is disposed in the gaps between the unit batteries 100. A clamping beam member 72 is attached so as to bridge the pair of the restriction plate 70*a*, 70*b*. The unit batteries 100 can be restricted so that a predetermined load can be applied in the arrangement direction of the unit batteries 100 by clamping or fixing the end portions of the beam member 72 to the restriction plates 70*a*, 70*b* with a screw 74.

In the above-described restriction process, side walls of the battery case of each unit battery 100 are pushed by the spacer plate 76 (that is, a load is applied). As shown in FIG. 6, the flat wound electrode body 10 is further deformed in a flat shape by a load (restriction force) acting upon the side walls of the battery case, and in the winding end portion 28 of the negative electrode sheet 20 disposed in either of the winding straight portions in the flat wound electrode body 10 (in FIG. 6, the winding end portion 28 of the negative electrode sheet, 20 disposed in the upper straight portion 12*a*) is strongly held in the position thereof.

With such a configuration of the battery pack 200, the first electrode sheet (in this configuration, the negative electrode sheet) 20 that constitutes the flat wound electrode body 10 can be strongly held by the restriction force of the restriction member. Therefore, even when the flat wound electrode body 10 repeatedly expands and contracts as the battery is charged and discharged, the surface pressure applied to the winding end portion 38 of the second electrode sheet 30 by the stable tightening force of the first electrode sheet 20 can be maintained with better stability (evenly) and a uniform electrode reaction can be caused to proceed between the electrode sheets 20, 30. Thus, with such a configuration, the battery pack 200 including unit batteries having good battery performance (for example, cyclic characteristic and the like) can be provided.

Other embodiments of the invention will be described below. Structural components identical to those of the above-described Embodiment 1 will be assigned with same numerals and explanation thereof will be omitted.

Figure 7:
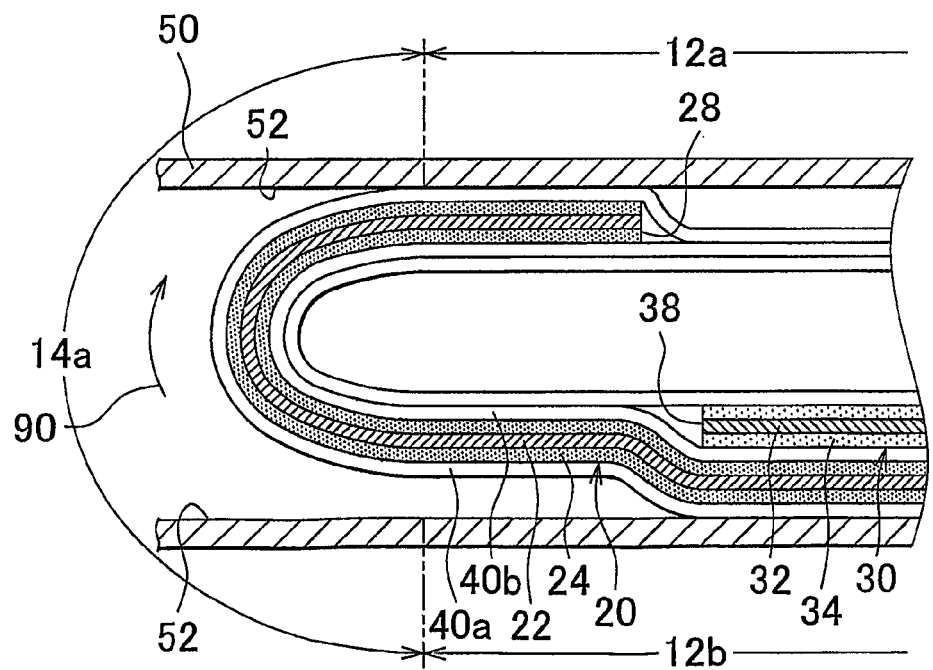
FIG. 7 is a principal cross-sectional view of the battery of the embodiment of the invention.

Embodiment 2. First, Embodiment 2 of the invention will be explained with reference to FIG. 7. As shown in FIG. 7, the winding end portion 38 of the second electrode sheet (positive electrode sheet) 30 is disposed in the lower straight portion 12*b*, and the winding end portion 28 of the first electrode sheet (negative electrode sheet) 20 is disposed in the upper straight portion 12*a* where the winding end portion 38 of the second electrode sheet 30 is not disposed. Thus, in the example shown in FIG. 7, the winding end portion 28 of the first electrode sheet 20 is disposed so as to pass the straight portion 12*b* where the winding end portion 38 of the second electrode sheet 30 is disposed and reach the next straight portion 12*a* (that is, the very first straight portion 12*a* located forward in the winding direction 90). With such a configuration, an adequate tightening force is also applied to the first electrode sheet (negative electrode sheet) 20 on the outer peripheral side, thereby making it possible to hold reliably the winding end portion of the second electrode sheet (positive electrode sheet) 30.

Figure 8:
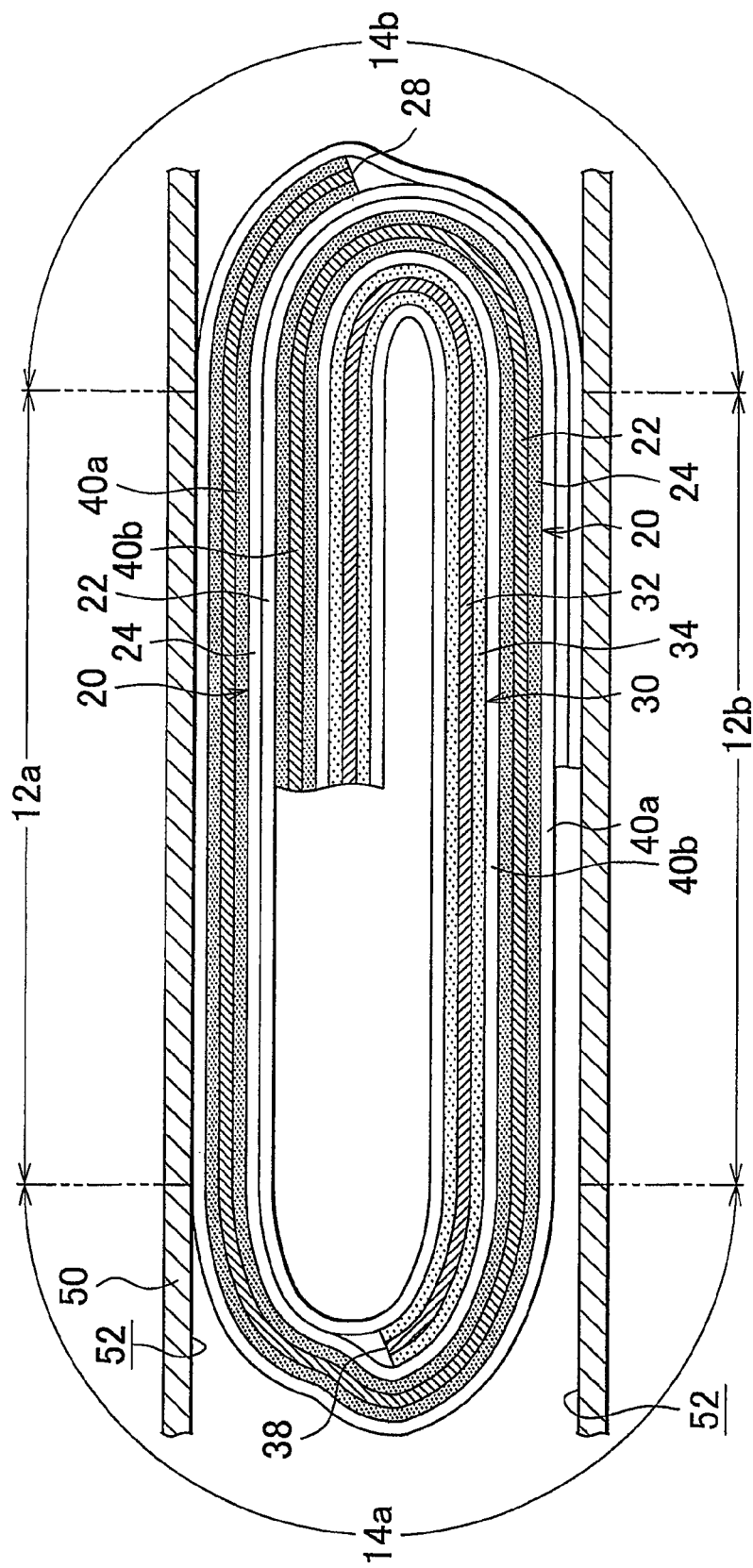
FIG. 8 is a principal cross-sectional view of the battery of the embodiment of the invention.

Embodiment 3. Then, Embodiment 3 of the invention will be described below with reference to FIG. 8. In Embodiment 3, as shown in FIG. 8, the winding end portion 38 of the second electrode sheet (positive electrode sheet) 30 is disposed in the left rounded portion 14*a*, and the winding end portion 28 of the first electrode sheet (negative electrode sheet) 20 is disposed in the right rounded portion 14*b* where the winding end portion 38 of the positive electrode sheet 30 is not disposed. Thus, in the example shown in FIG. 8, the winding end portion 28 of the negative electrode sheet 20 is disposed so as to pass the left rounded portion 14*a* where the winding end portion 38 of the positive electrode sheet 30 is disposed and pass through the next straight portion 12*a* (very first straight portion 12*a* located forward in the winding direction 90). The end portions of the separators that sandwich the first electrode sheet 20 are disposed in the straight portion 12*b*.

With such a configuration, the winding end portion 38 of the second electrode sheet (positive electrode sheet) 30 is disposed in one rounded portion 14*a*, and the winding end portion 28 of the first electrode sheet (negative electrode sheet) 20 is disposed in the other rounded portion 14*b*. As a result, no extra edge (that is, the winding end portion 28 of the first electrode sheet 20) is formed at the straight portion 12*a* of the flat wound electrode body 10. Therefore, when a force acts in the expansion direction of the flat wound electrode body, a uniform load can be applied to the straight portion 12*a* of the flat wound electrode body 10 by the battery case. As a consequence, a more uniform electrode reaction can be caused to proceed between the positive electrode and negative electrode and battery performance (for example, cyclic charge and discharge characteristic) is improved.

The following tests were conducted as examples for confirming the possibility of obtaining a battery having good cyclic characteristic by constructing the battery by using the flat wound electrode body in accordance with the invention.

Example 1. A wound body was produced by winding a negative electrode sheet 20 obtained by forming a negative electrode active material layer for a lithium ion battery on the surface of a copper foil as a negative electrode collector and a positive electrode sheet 30 obtained by forming a positive electrode active material layer for a lithium ion battery on the surface of an aluminum foil as a positive electrode collector via two separator sheets 40a, 40b. In this process, the negative electrode sheet 20 was wound so as to be wound on the outer peripheral side with respect to the positive electrode sheet 30. Furthermore, the winding was performed so that the position in which the negative electrode sheet 20 and positive electrode sheet 30 overlapped was slightly shifted in the winding direction 90, so that the end position (winding end portion 28) of the negative electrode sheet 20 projected forward in the winding direction 90 with respect to the end position (winding end portion 38) of the positive electrode sheet 30. The number of turns in the positive electrode sheet 30 that has been wound on the inner side was 30.

The wound body was then pressure molded by pressing from the side surface direction, and a flat wound electrode body of a flat shape in the transverse section was produced. The press molding was performed so that the winding end portion 28 of the negative electrode sheet 20 and the winding end portion 38 of the positive electrode sheet 30 are positioned as shown in FIG. 4. The size of the flat wound electrode body after pressing was 40 mm×60 mm.

A lithium ion secondary battery for evaluation was then constructed by welding the negative electrode collector terminal 80a and positive electrode collector terminal 80b to the obtained flat wound electrode body and accommodating the flat wound electrode body together with an electrolytic solution in an angular battery case.

Example 2. A flat wound electrode body was produced and a lithium ion secondary battery for testing was constructed in the same manner as in Example 1, except that the winding was performed by shifting by the predetermined amount the position where the negative electrode sheet 20 and positive electrode sheet 30 overlapped during winding in the winding direction 90 and performing press molding so that the winding end portion 28 of the negative electrode sheet 20 and the winding end portion 38 of the positive electrode sheet 30 are positioned as shown in FIG. 7 during pressurization molding.

Example 3. A flat wound electrode body was produced and a lithium ion secondary battery for testing was constructed in the same manner as in Example 1, except that the winding was performed by shifting by the predetermined amount the position where the negative electrode sheet 20 and positive electrode sheet 30 overlap during winding in the winding direction 90 and performing press molding so that the winding end portion 28 of the negative electrode sheet 20 and the winding end portion 38 of the positive electrode sheet 30 are positioned as shown in FIG. 8 during pressurization molding.

Example 4. A flat wound electrode body was produced and a lithium ion secondary battery for testing was constructed in the same manner as in Example 1, except that a pair of restriction plates were disposed on both sides of the battery case for testing so as to enable the restriction such that a predetermined load was applied to the battery from the side surface direction.

Figure 10:
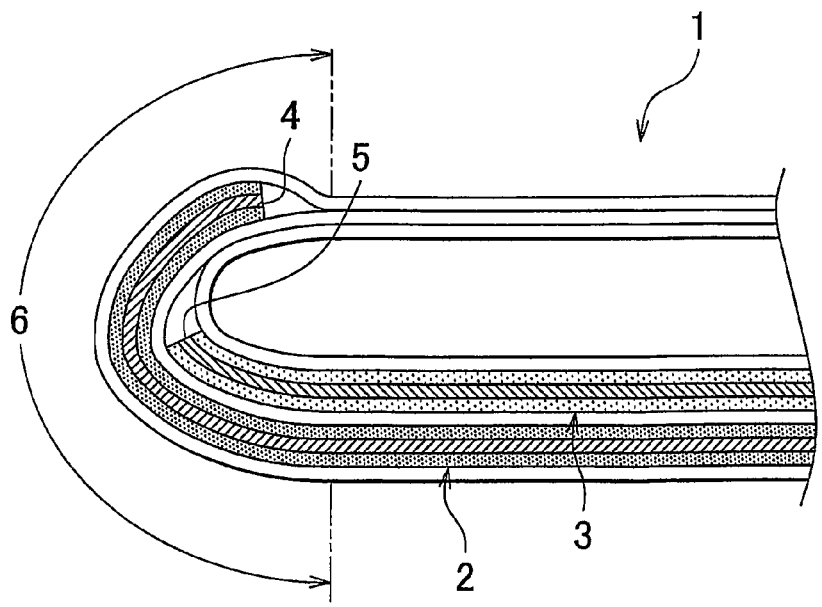
FIG. 10 is a principal cross-sectional view of the conventional flat wound electrode body.

Comparative Example. A flat wound electrode body was produced and a lithium ion secondary battery for testing was constructed in the same manner as in Example 1, except that the winding was performed by shifting by the predetermined amount the position where the negative electrode sheet and positive electrode sheet overlapped during winding in the winding direction and performing press molding so that the winding end portion of the negative electrode sheet and the winding end portion of the positive electrode sheet are positioned as shown in FIG. 10 during pressurization molding (that is, the winding end portion 4 of the negative electrode sheet 2 and the winding end portion 5 of the positive electrode sheet 3 were disposed in the same rounded portion 6).

Figure 9:
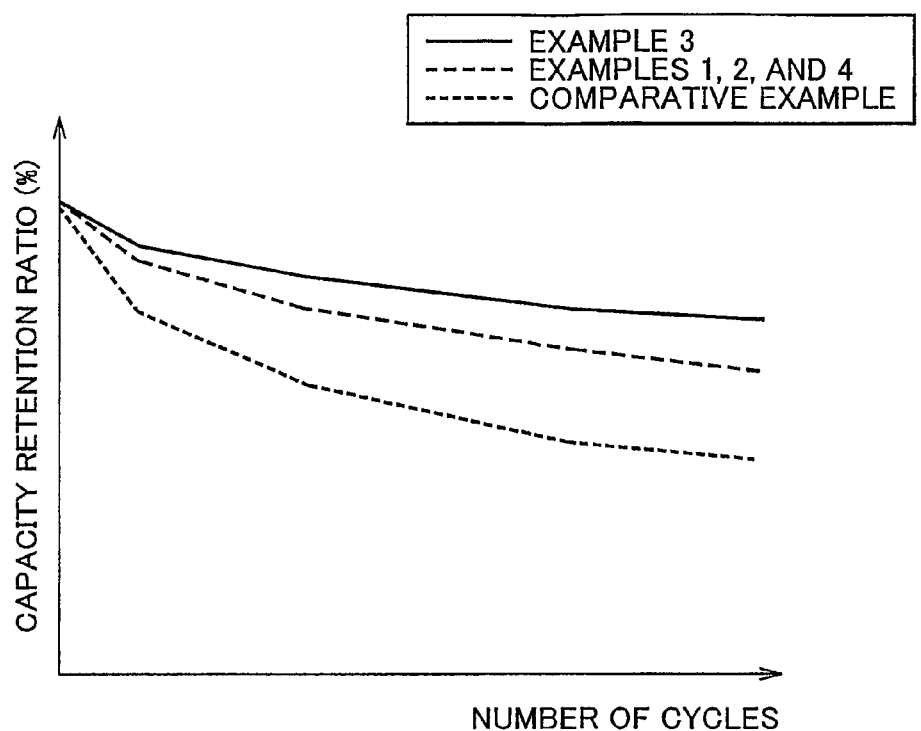
FIG. 9 illustrates the results obtained in a charge-discharge cyclic characteristic test.

Cyclic Characteristic Test. The above-described produced test batteries were subjected to a charge-discharge cyclic test and a capacity retention ratio of each battery was evaluated. The capacity retention ratio is a ratio of battery capacity after completion of charging after a predetermined number of charging-discharging cycles, where the battery capacity after completion of the initial charging is taken as 100%. The higher is the capacity retention ratio, the better is the cyclic characteristic. The produced test batteries were repeatedly charged and discharged at a charge-discharge current of 20 C, and variations in battery capacity after 1,000 cycles, 2,000 cycles, 4,000 cycles, 6,000 cycles, 8,000 cycles, and 10,000 cycles were measured. The results are shown in Table 1. FIG. 9 shows schematic graphs representing the variations in battery capacity (capacity retention ratio) obtained in the examples and comparative example on the basis of the results shown in Table 1. In FIG. 9, the number of charge-discharge cycles is plotted against the abscissa, and the capacity retention ratio is plotted against the ordinate.

TABLE 1

| Number of cycles | Comparative Example | Examples 1, 2, and 4 | Example 3 |
| --- | --- | --- | --- |
| 0 | 100 | 100 | 100 |
| 1,000 | 95.8 | 97.5 | 98.1 |
| 2,000 | 94.3 | 96.8 | 97.5 |
| 4,000 | 92 | 95.2 | 96.6 |
| 6,000 | 90.7 | 94.3 | 95.9 |
| 8,000 | 89.7 | 93.5 | 95.2 |
| 10,000 | 89 | 92.8 | 95 |

As follows from Table 1 and FIG. 9, where the measurement results obtained in Examples 1 to 4 and the measurement results obtained in the comparative example are compared, it is clear that the capacity retention ratio in Examples 1 to 4 is higher than that of the comparative examples at the same number of cycles. Thus, it can be said that the charge-discharge cyclic characteristic of the batteries of examples 1 to 4 is improved and life represented by cyclic endurance is increased over those of the battery of the comparative example. Furthermore, the capacity retention ratio of the battery of Example 3 was found to be increased over that of Examples 1, 2, and 4. Therefore, it was confirmed that the charge-discharge cyclic characteristic can be improved by disposing the winding end portion 28 of the negative electrode sheet 20 and the winding end portion 38 of the positive electrode sheet 30 at different (left and right) rounded portions 14a, 14b, as shown in FIG. 8.

Because the battery 100 of the present embodiment excels in battery performance (in particular, the cyclic characteristic), as described hereinabove, such a battery can be advantageously used as a power source for a motor (electric motor) to be installed on a vehicle such as an automobile. For example, a vehicle can be provided (typically, an automobile, an automobile provided with an electric motor, such as a hybrid automobile, an electric automobile, and a fuel cell automobile) that has the battery pack 200 shown in FIG. 5 as a power source.

Embodiments of the invention are described hereinabove, but the invention is not limited to these embodiments, and can be modified in a variety of ways. For example, in the above-described Embodiments 1 to 3, the negative electrode sheet (first electrode sheet) is disposed so as to be wound on the outer peripheral side with respect to the positive electrode sheet (second electrode sheet), but an inverse configuration may be also used. Thus, the positive electrode sheet (first electrode sheet) can be disposed so as to be wound on the outer peripheral side with respect to the negative electrode sheet (second electrode sheet). Furthermore, because a portion of the first electrode sheet that protrudes forward in the winding direction with respect to the winding end portion of the second electrode sheet corresponds to a sheet portion that makes no contribution to the electrode reaction between the positive electrode and negative electrode, this portion may be constituted only by the electrode collector (core member), without attaching the electrode active material layer. Furthermore, in the present embodiment, the electrode active material non-formation portions 26, 36 are formed in one side edge portion along the end side in the transverse direction of the first and second electrode sheets 20, 30, as shown in FIG. 3, but such a configuration is not limiting. For example, the electrode active material non-formation portions may be also formed in one side edge portion along the end side in the longitudinal direction of the first and second electrode sheets 20, 30.

In this case, when the sheets are laminated and wound, the electrode active material non-formation portion (electrode collector) of the second electrode sheet 30 that is wound on the inner peripheral side is disposed to protrude downstream in the winding direction, and the electrode active material non-formation portion (electrode collector) of the first electrode sheet 20 that is wound on the outer peripheral side is disposed to protrude upstream in the winding direction. Furthermore, the electrode active material non-formation portion (electrode collector) of the first electrode sheet 20 may be wound so as to enfold the winding end portion of the second electrode sheet 30, as the electrode active material non-formation portion (electrode collector) of the second electrode sheet 30 is wound up on a winding core.

A configuration shown in FIG. 11 can be considered as another mode for attaining the object of the invention. In this configuration, the winding end portion 38 of the second electrode sheet 30 that is wound on the inner side is disposed in the straight portion 12*a*. The winding end portion 28 of the first electrode sheet 20 that is wound on the outer side passes the straight portion 12*a* where the winding end portion 38 of the second electrode sheet 30 is disposed, but does not reach the next straight portion 12*b* and is disposed in the rounded portion 14*b*. With such a configuration, a stable surface pressure applied to the flat wound electrode body can be also maintained due to the mutual arrangement of the first electrode sheet 20 and second electrode sheet 30. More specifically, the winding end portion 38 of the second electrode sheet 30 may be disposed in the winding straight portion 12*a*A on the farther side (left side in the figure: the first half of the straight portion) when the straight portion 12*a* is divided into two equal portions, as viewed from the rounded portion 14*b* where the winding end portion 28 of the first electrode sheet 20 is disposed. With such a configuration, the length of the portion of the first electrode sheet 20 that protrudes forward in the winding direction from the winding end portion 38 of the second electrode sheet 30 can be made larger than the length of a half of the straight portion 12*a* and such that ensures a stable tightening force. As a result, the winding end portion 38 of the second electrode sheet 30 can be tightly wound by the first electrode sheet 20 by a stable tightening force. In this configuration, the end portions of the separators that sandwich the first electrode sheet 20 are disposed in the straight portion 12*b*. A comparative example of the mode shown in FIG. 11 is shown in FIG. 12. In this configuration, the winding end portion 38 of the second electrode sheet 30 is disposed in the straight portion 12*a*B on the closer side (right side in the figure) when the straight portion 12*a* is divided into two equal portions, when viewed from the rounded portion 14*b* where the winding end portion 28 of the first electrode sheet 20 is disposed. With this configuration, the length of the portion of the first electrode sheet 20 that protrudes forward in the winding direction with respect to the winding end portion 38 of the second electrode sheet 30 becomes too small. As a result, is can be impossible to wind tightly the winding end portion 38 of the second electrode sheet 30 by the first electrode sheet 20 by a stable tightening force.

The invention claimed is:

1. A battery comprising:
    a flat wound electrode body that is obtained by winding a first electrode sheet and a second electrode sheet in a flat shape via a separator sheet, the flat wound electrode body being constituted by first and second straight portions and first and second rounded portions; and
    a battery case that accommodates the flat wound electrode body, wherein
    the first electrode sheet is formed by attaching a first electrode active material layer to one surface of a first collector and attaching a second electrode active material layer to another surface of the first collector and the second electrode sheet is formed by attaching a third electrode active material layer to one surface of a second collector and attaching a fourth electrode active material layer to another surface of the second collector;
    the first electrode sheet includes a first winding end portion and the second electrode sheet includes a second winding end portion;
    the first electrode sheet is disposed in the flat wound electrode body so as to be wound on an outer peripheral side of the flat wound electrode body with respect to the second electrode sheet;
    the first electrode sheet is wound so as to enfold the second winding end portion;
    the first winding end portion includes the first and second electrode active material layers, and the second winding end portion includes the third and fourth electrode active material layers;
    the second winding end portion is disposed on one of the first straight portion, the second straight portion, the first rounded portion, and the second rounded portion; and
    the first winding end portion is disposed so as to pass the second winding end portion and to reach or pass through either the first or second straight portion following the portion where the second winding end portion is disposed.

2. The battery according to claim 1, wherein
    the second winding end portion is disposed in either of the first and second straight portions, and the first winding end portion is disposed in the other of the first and second straight portions where the second winding end portion is not disposed.

3. The battery according to claim 1, wherein
the second winding end portion is disposed in either of the first or second rounded portions; and
the first winding end portion passes the first or second rounded portion where the second winding end portion is disposed, the first winding end portion being disposed in either the first or second straight portion following the first or second rounded portion where the second winding end portion is disposed.

4. The battery according to claim 1, wherein
the second winding end portion is disposed in either of the first and second rounded portions; and
the first winding end portion is disposed in the other of the first and second rounded portion portions where the second winding end portion is not disposed.

5. A battery pack comprising, as unit batteries, a plurality of the batteries according to claim 1, wherein
the plurality of unit batteries are arranged in an orientation such that the first and second straight portions of the flat wound electrode bodies are accommodated in the battery cases of the respective unit batteries facing each other;
a restriction member is attached to an outer side of the battery case of each unit battery so that a restriction force is applied in the arrangement direction; and
a wound state of the first electrode sheet in the flat wound electrode body of each unit battery is maintained by the restriction force.

6. A vehicle that has installed therein the battery according to claim 1.

7. A vehicle that has installed therein the battery pack according to claim 5.

* * * * *